(12) United States Patent
Mansouri et al.

(10) Patent No.: US 11,518,281 B2
(45) Date of Patent: Dec. 6, 2022

(54) LIGHT WEIGHT METAL BACK WITH EXTRA LIVING SPACE

(71) Applicant: Safran Seats USA LLC, Gainesville, TX (US)

(72) Inventors: Reza Mansouri, Costa Mesa, CA (US); Charles Michael Parker, Irvine, CA (US); Romain Tranier, Costa Mesa, CA (US); Nicholas Potts, Laguna Beach, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/271,114

(22) PCT Filed: Sep. 4, 2018

(86) PCT No.: PCT/US2018/049361
§ 371 (c)(1),
(2) Date: Feb. 24, 2021

(87) PCT Pub. No.: WO2020/050818
PCT Pub. Date: Mar. 12, 2020

(65) Prior Publication Data
US 2021/0331609 A1  Oct. 28, 2021

(51) Int. Cl.
*B60N 2/68* (2006.01)
(52) U.S. Cl.
CPC ............. *B60N 2/686* (2013.01); *B60N 2/682* (2013.01)

(58) Field of Classification Search
CPC .................................. B60N 2/686; B60N 2/68
See application file for complete search history.

(56) References Cited

U.S. PATENT DOCUMENTS

| | | |
|---|---|---|
| 5,165,756 A | 11/1992 | Baker et al. |
| 5,671,976 A | 9/1997 | Fredrick |
| 5,749,135 A | 5/1998 | Crane et al. |
| 2011/0298267 A1* | 12/2011 | Yamaki ................. B60N 2/682 297/391 |
| 2015/0314501 A1* | 11/2015 | Maslakow ........ B29C 45/14786 297/452.18 |

(Continued)

FOREIGN PATENT DOCUMENTS

| | | | |
|---|---|---|---|
| CN | 104760526 A | * | 7/2015 |
| CN | 108284775 A | * | 7/2018 |

(Continued)

OTHER PUBLICATIONS

International Patent Application No. PCT/US2018/049361, International Search Report and Written Opinion, dated Aug. 13, 2019.

(Continued)

*Primary Examiner* — Timothy J Brindley
(74) *Attorney, Agent, or Firm* — Kilpatrick Townsend & Stockton LLP

(57) ABSTRACT

Described are seat backs for passenger seats. The seat back includes a frame, and the frame includes an upper portion and a lower portion. The upper portion includes a top end of the seat back, and the lower portion is adjacent to the upper portion. A thickness of the upper portion of the frame may be less than a thickness of the lower portion of the frame.

7 Claims, 5 Drawing Sheets

(56) References Cited

U.S. PATENT DOCUMENTS

| | | | |
|---|---|---|---|
| 2016/0009210 A1* | 1/2016 | Sasaki | B60N 2/4228 297/180.13 |
| 2017/0217347 A1* | 8/2017 | McKibbin | B29C 45/14336 |
| 2017/0341622 A1* | 11/2017 | Mizobata | B60N 2/682 |
| 2018/0001809 A1* | 1/2018 | Kaneda | B60N 2/686 |
| 2018/0222357 A1* | 8/2018 | Mochizuki | B60N 2/22 |
| 2019/0299827 A1* | 10/2019 | Kinard | B60N 2/70 |

FOREIGN PATENT DOCUMENTS

| | | | | |
|---|---|---|---|---|
| CN | 109606223 A | * | 4/2019 | |
| DE | 3515631 A1 | * | 11/1985 | B60N 2/686 |
| DE | 20109666 U1 | * | 10/2002 | B60N 2/686 |
| DE | 102016208467 A1 | | 11/2016 | |
| DE | 102018128353 A1 | * | 5/2020 | B32B 5/022 |
| EP | 2789499 A1 | | 10/2014 | |
| EP | 3144179 A1 | | 3/2017 | |
| JP | 2005000194 A | * | 1/2005 | B60N 2/686 |
| WO | 2001092051 A1 | | 12/2001 | |
| WO | 2009149177 A1 | | 12/2009 | |
| WO | 2010088384 A1 | | 8/2010 | |
| WO | WO-2011001622 A1 | * | 1/2011 | B60N 2/682 |
| WO | WO-2012091431 A2 | * | 7/2012 | B60N 2/682 |
| WO | WO-2013142773 A1 | * | 9/2013 | A47C 7/40 |
| WO | WO-2013142798 A1 | * | 9/2013 | A47C 7/40 |
| WO | WO-2014104213 A1 | * | 7/2014 | B60N 2/686 |
| WO | WO-2016021554 A1 | * | 2/2016 | B60N 2/68 |
| WO | WO-2018009201 A | * | 1/2018 | B60N 2/7017 |

OTHER PUBLICATIONS

International Patent Application No. PCT/US2018/049361, Invitation to Pay Additional Search Fee and Partial Search Report, dated Jul. 12, 2019.

Europe Patent Application No. 18778703.1, Examination Report (Communication pursuant to Article 94(3) EPC), dated Apr. 5, 2022.

Europe Patent Application No. 18778703.1, Office Action (Communication pursuant to Article 94(3) EPC), dated Sep. 28, 2022.

* cited by examiner

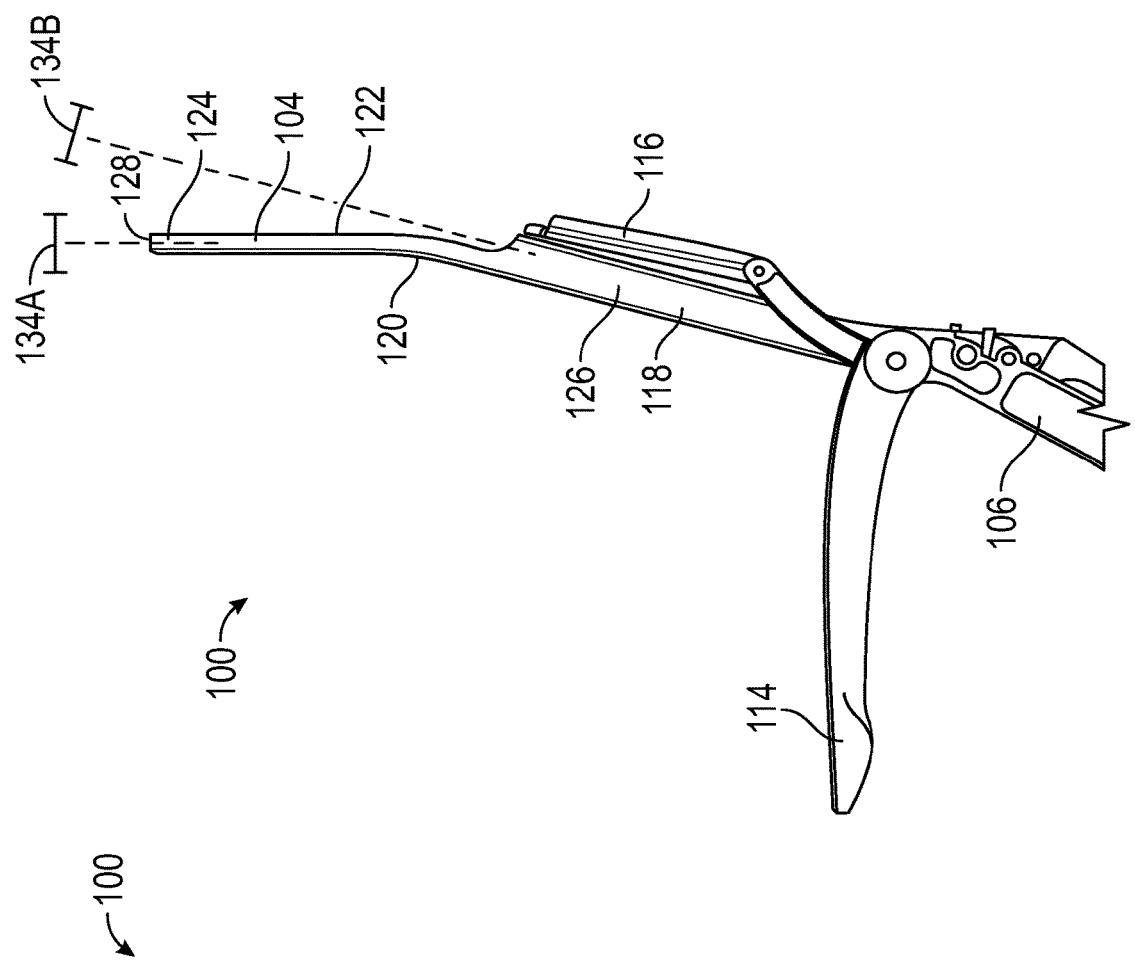
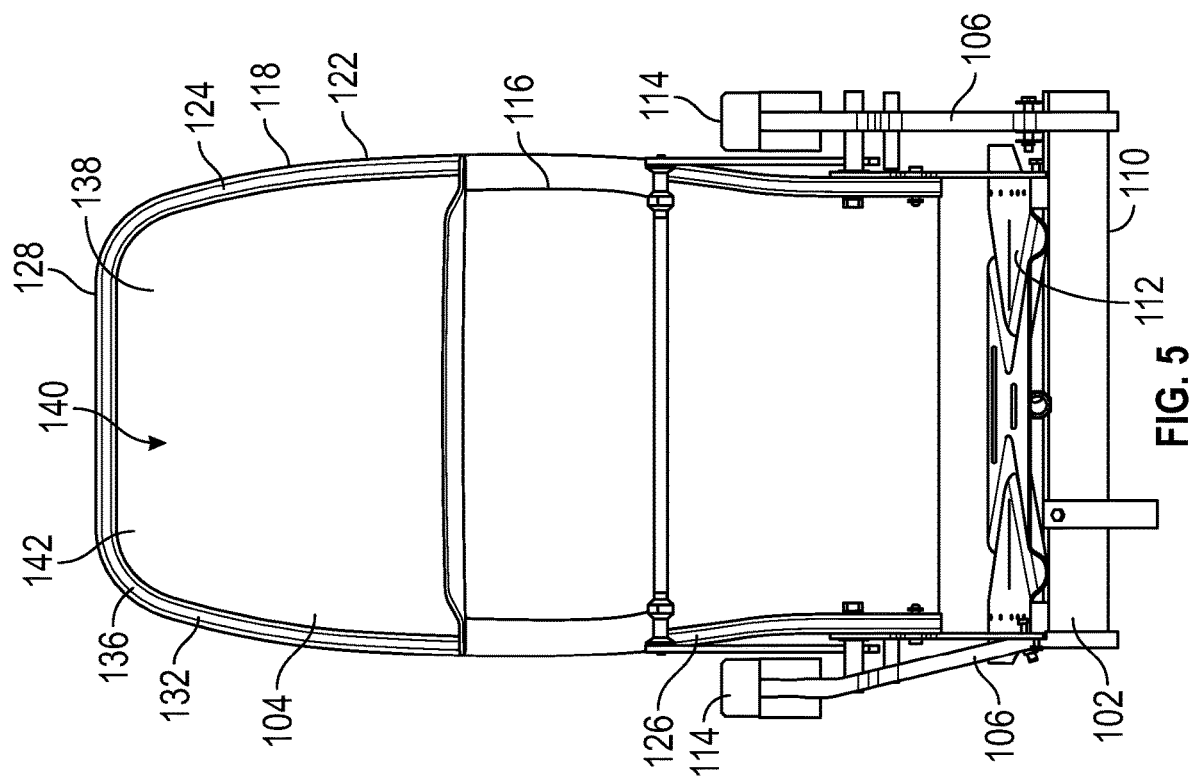

LIGHT WEIGHT METAL BACK WITH EXTRA LIVING SPACE

FIELD OF THE INVENTION

The field of the invention relates to passenger seats, and, more particularly, to passenger seats with extra living space.

BACKGROUND

Passenger vehicles, such as aircraft, buses, trains, ships, and automobiles, include passenger seats for passengers to sit in and utilize during travel. Each passenger seat has a living space, or an area that a passenger can utilize while seated within the passenger seat. The living space of a particular passenger seat is at least partially defined by a seat back of a forward passenger seat. Most seat backs are metal, and while the constant cross section of the seat back are necessary to provide stiffness and strength, it also limits the passenger living space. In view of the limitations of existing seat backs, there is a need for a passenger seat that provides improved living space.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat back for a passenger seat includes a frame, and the frame includes an upper portion and a lower portion. The upper portion includes a top end of the seat back, and the lower portion is adjacent to the upper portion. In some cases, a thickness of the upper portion of the frame is less than a thickness of the lower portion of the frame.

In various examples, the frame is tubular and defines a central cavity. In some embodiments, the frame supports a back sheet, and the back sheet defines a housing area in an aft side of the seat back. In certain examples, the upper portion of the frame extends vertically at a non-zero angle relative to the lower portion of the frame. In various aspects, the seat back further includes a reinforcing member reinforcing at least a portion of the upper portion of the frame. In certain cases, the reinforcing member includes at least one of a doubler and a stiffener joined to the upper portion of the frame. In some aspects, the frame includes a metal material.

According to certain embodiments of the present invention, a passenger seat includes a seat back having a tubular frame. The tubular frame includes a forward side, an aft side, an upper portion, and a lower portion. A distance from the forward side to the aft side is a thickness of the tubular frame, and the thickness of the upper portion of the tubular frame is less than the thickness of the lower portion of the tubular frame.

In some examples, the passenger seat further includes a seat base, and the seat back is joined to the seat base. In some aspects, the passenger seat further includes a reinforcing member joined to at least a portion of the upper portion of the tubular frame, and the reinforcing member includes at least one of a doubler and a stiffener. In certain examples, the reinforcing member defines a mounting location for a shroud mount or a video mount. In some aspects, the reinforcing member is joined to the portion of the upper portion of the tubular frame through at least one of a mechanical fastener, welding, and an adhesive. In various cases, the upper portion of the tubular frame extends vertically at a non-zero angle relative to the lower portion of the tubular frame such that the upper portion of the tubular frame extends forward relative to the lower portion of the tubular frame. In some examples, the tubular frame supports a back sheet, and the sheet defines a housing area in an aft side of the seat back. In various aspects, the tubular frame includes a metal material.

According to certain embodiments of the present invention, a seat back for a passenger seat includes a seat back frame, and the seat back frame includes a lower portion and an upper portion. The lower portion is adapted to pivotally join with a seat base and includes a lower portion thickness. The upper portion extends at a non-zero angle relative to the lower portion and includes an upper portion thickness that is less than the lower portion thickness.

In various aspects, the seat back further includes a reinforcing member joined to at least a portion of the upper portion of the seat back frame, and the reinforcing member includes at least one of a doubler and a stiffener. In some examples, the seat back frame is a tubular frame and defines a central cavity, the seat back further includes a back sheet supported by the seat back frame, and the seat back frame and the back sheet define a housing area in an aft side of the seat back. In certain examples, the seat back frame includes a metal material. In various cases, the upper portion of the seat back frame extends forward relative to the lower portion of the seat back frame.

According to certain embodiments of the present invention, a passenger seat includes a seat back having a hollow frame. The hollow frame includes a forward side, an aft side, and a central cavity defined within the hollow frame. In certain aspects, a distance from the forward side to the aft side is a thickness of the hollow frame. In some aspects, at least a portion of the aft side of the hollow frame defines an aperture providing access to the central cavity.

In some examples, the passenger seat further includes a seat base, and the seat back is joined to the seat base. In various aspects, the thickness of the hollow frame is from about 2.0 mm to about 25.0 mm. In certain examples, the passenger seat further includes a reinforcing member, and the reinforcing member is positionable in the aperture and is joined to the hollow frame. In various examples, the hollow frame further includes an upper portion and a lower portion, the upper portion defines a top end of the seat back, and the thickness of the upper portion of the hollow frame is less than the thickness of the lower portion of the hollow frame. In some cases, the upper portion defines the aperture providing access to the central cavity. In some aspects, the entire aft side of the hollow frame defines the aperture providing access to the central cavity.

BRIEF DESCRIPTION OF THE DRAWINGS

FIG. 5 is a back view of the passenger seat of FIG. 1.

FIG. 6 is a side view of a portion of the passenger seat of FIG. 1.

DETAILED DESCRIPTION

Figure 2:
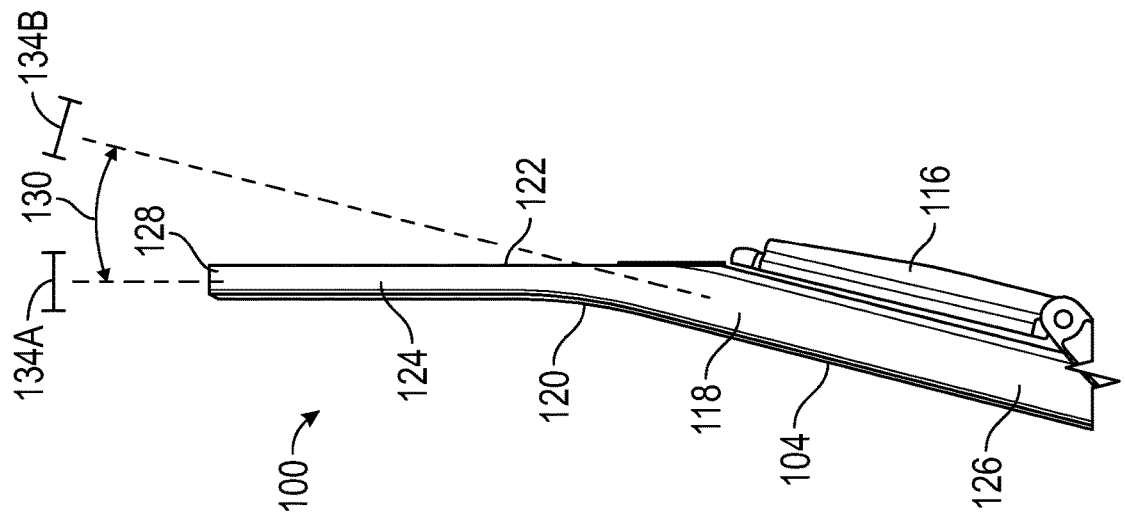
FIG. 2 is a side view of the passenger seat of FIG. 1 taken from detail circle 2 in FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat backs for passenger seats with increased living space. While the seat backs are discussed for use with aircraft seats, they are by no means so limited. Rather, embodiments of the seat backs may be used in passenger seats or other seats of any type or otherwise as desired.

According to certain embodiments of the present invention, as shown in FIGS. 1-7, a passenger seat assembly 100 includes at least one seat base 102 and at least one seat back 104. The number of seat bases 102 and/or seat backs 104 should not be considered limiting on the current disclosure. In various examples, the number of seat backs 104 correspond with the number of passengers that the passenger seat is capable of carrying. In the example of FIGS. 1-7, the passenger seat assembly 100 is capable of carrying one passenger, and accordingly has one seat back 104. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 104.

Figure 1:
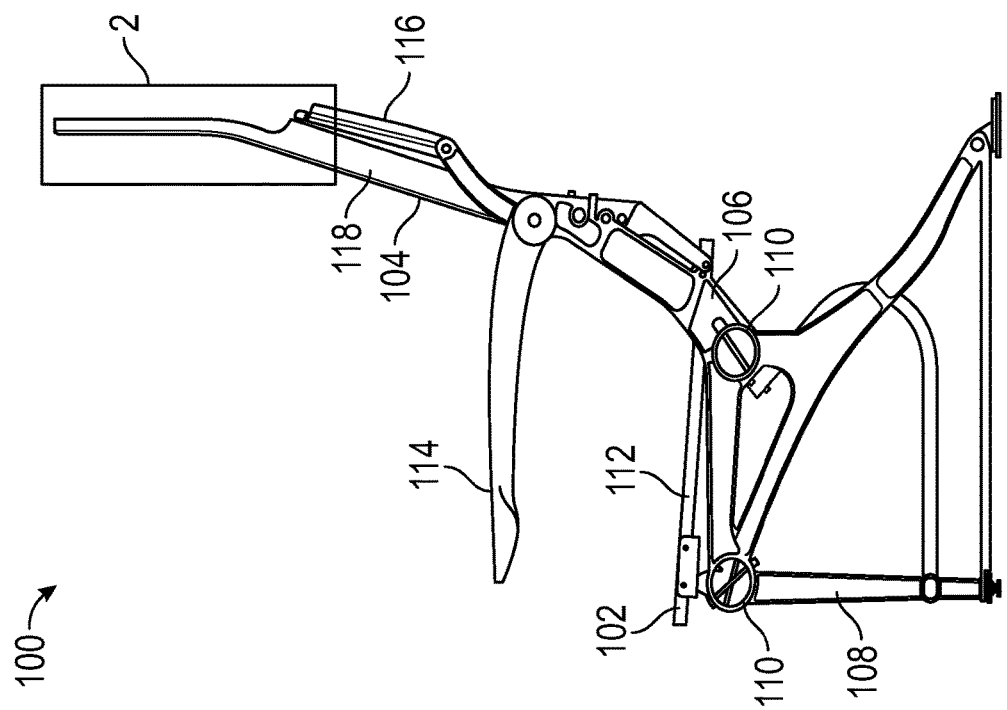
FIG. 1 is a side view of a passenger seat with a seat back according to certain embodiments of the present invention.

As best illustrated in FIGS. 1 and 5, the seat base 102 of the passenger seat assembly 100 generally includes a support frame 106 and a leg assembly 108. Optionally, the seat base 102 further includes at least one base frame tube 110, at least one seat pan 112, a tray table 116, and/or at least one armrest 114. When provided with the passenger seat assembly 100, the tray table 116 and/or armrest 114 may be pivotably connected to the passenger seat assembly 100. Although not illustrated, various cushioning and/or covering material may be provided to cover the various portions of the seat base 102 and/or the seat back 104.

The seat back 104 is connected to the seat base 102, and is often pivotable relative to the seat base 102 such that the seat back 104 can be positioned in various positions such as a taxi-takeoff-landing (TTL) position, a reclined position, etc. The seat back 104 includes a frame 118 and a back sheet 138. The frame 118 includes a forward side 120, an aft side 122, an upper portion 124, and a lower portion 126. The frame 118 and/or back sheet 138 may be constructed from various suitable materials including, but not limited to aluminum, stainless steel, other metallic materials, composite materials, and/or other suitable materials.

In various aspects, the frame 118 supports the back sheet 138. Optionally, the back sheet 138 is supported at the forward side 120 of the frame 118, although it need not be. In certain aspects, the back sheet 138 may be joined to the frame 118 through various suitable mechanisms including, but not limited to, welding, adhesives, mechanical fasteners, and/or various other suitable mechanisms or combination of mechanisms. In some examples, the back sheet 138 may be attached to both the forward side 120 and the lower portion 126. However, in other examples, the back sheet 138 may only be attached to the forward side 120, the lower portion 126, and/or various other locations or combinations of locations on the frame 118 as desired. When used by the passenger, a passenger may rest his or her back against the back sheet 138.

Figure 3:
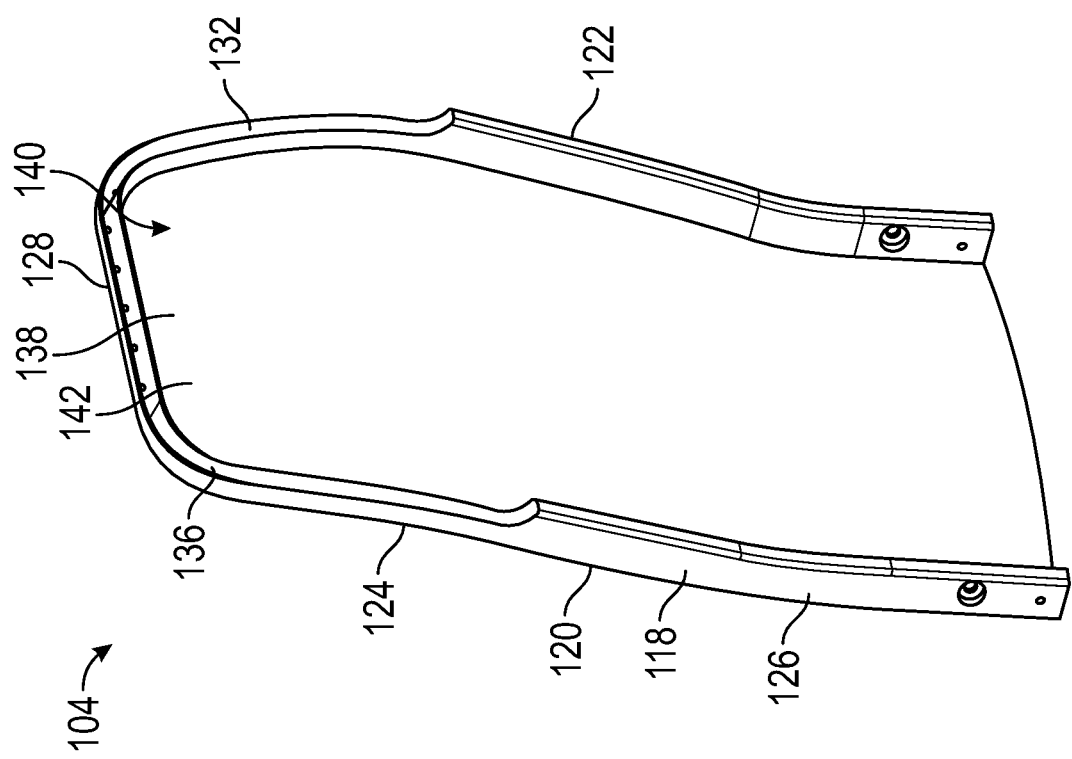
FIG. 3 is a perspective view of the seat back of the passenger seat of FIG. 1.

As illustrated in FIGS. 3 and 5, in various examples, the back sheet 138 is joined to the frame 118 such that a housing area 140 is defined in the aft side of the seat back 104. In certain aspects, the housing area 140 includes a housing area surface that is recessed within the seat back 104 relative to the aft side 122 of the frame 118. The housing area 140 may be used to house and/or support various other components that may be included with the passenger seat assembly 100, including, but not limited to, an In-Flight Entertainment (IFE) system, a literature or storage pocket, and/or various other components as desired. In some cases, the tray table 116 may optionally be at least partially positioned within the housing area 140 when the tray table 116 is stowed.

Figure 4:
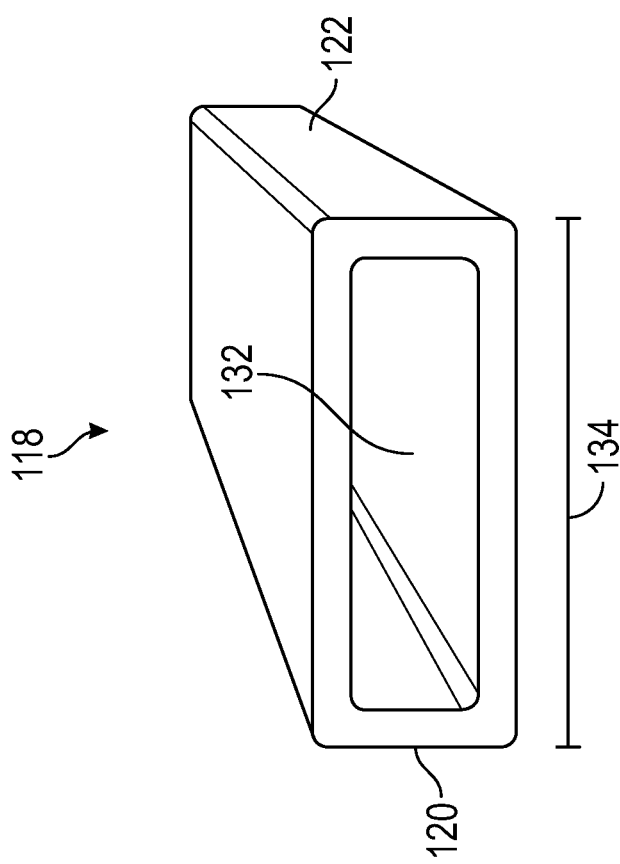
FIG. 4 is a perspective view of a portion of a frame of the seat back of FIG. 1 according to certain embodiments of the present invention.

As best illustrated in FIG. 4, in various examples, the frame 118 is tubular or hollow, meaning that the frame 118 defines a central cavity 132. In various examples, the frame 118 may be a continuous or single component. However, in other examples, the frame 118 may include one or more frame segments that are joined together through various suitable techniques to form the frame 118. As one non-limiting example, a plurality of hollow frame segments may be cut and joined together by sliding into each other to form the overall frame 118. Various other configurations or joining techniques may be used to form the frame 118.

The upper portion 124 defines a top end 128 of the seat back 104, and, in some aspects, the lower portion 126 connects the seat back 104 with the seat base 102. As best illustrated in FIG. 2, in some optional examples, the upper portion 124 may be at a non-zero angle 130 relative to the lower portion 126. In such examples, the upper portion 124 may extend forward relative to the lower portion 126. However, in other examples, the upper portion 124 may not be angled relative to the lower portion 126 (e.g., the upper portion 124 may be coplanar with the lower portion 126).

A thickness 134 of the frame 118 is a distance from the forward side 120 to the aft side 122. In various examples, at least a portion of the frame 118 has a reduced thickness 134A, which is a thickness of from about 0.0 mm to about 25.4 mm. For example, in various cases, the reduced thickness may be about 0.0 mm, about 1.0 mm, about 2.0 mm, about 3.0 mm, about 4.0 mm, about 5.0 mm, about 6.0 mm, about 7.0 mm, about 8.0 mm, about 9.0 mm, about 10.0 mm, about 11.0 mm, about 12.0 mm, about 13.0 mm, about 14.0 mm, about 15.0 mm, about 16.0 mm, about 17.0 mm, about 18.0 mm, about 19.0 mm, about 20.0 mm, about 21.0 mm, about 22.0 mm, about 23.0 mm, about 24.0 mm, about 25.0 mm, and/or about 25.4 mm. In examples where the reduced thickness 134A is 0.0 mm, the back sheet 138 may be used as reinforcement and/or connection between components. It will be appreciated that in other examples, the reduced thickness of the frame may be greater than about 25.4 mm. For example, in other non-limiting cases, the reduced thickness may be up to about 70.0 mm.

In some examples, the entire frame 118 has the reduced thickness 134A. In other examples, less than the entire frame 118 has the reduced thickness. For example, as best illustrated in FIGS. 1, 2, and 6, in some non-limiting cases, the upper portion 124 has the reduced thickness 134A and the lower portion 126 has an unreduced thickness 134B, which is greater than the reduced thickness 134B. In other non-limiting examples, the lower portion 126 has the reduced thickness 134A and the upper portion 124 has the unreduced thickness 134B, a sub-portion of the lower portion 126 has the unreduced thickness 134B and the remainder of the frame 118 has the reduced thickness 134A, and/or various other portions, sub-portions, or combinations of the frame 118 may have the reduced thickness 134A and/or unreduced thickness 134B. As explained in detail below, in certain aspects, the reduced thickness 134A may increase the living space of an aft passenger seat assembly 100.

In various examples, the frame 118 is initially formed with at least a portion of the frame having the reduced thickness 134A prior to shaping and forming into the shape for the seat back 104. In other examples, the thickness of the frame 118 is reduced such that at least a portion of the frame 118 has the reduced thickness 134A after the frame 118 is shaped and formed into the shape for the seat back 104. As one non-limiting example, at least a portion of the frame 118 may be machined to reduce the thickness to the reduced thickness 134A, although various other techniques or combination of techniques may be utilized in other examples. As some non-limiting examples, other techniques or processes may include cutting techniques such as water jet cutting, machining or tubular forming techniques such as hydroforming, and/or various other suitable processes or techniques.

As best illustrated in FIG. 3, in certain examples, at least one opening 136 is defined in the aft side 122 of the frame 118. The at least one opening 136 provides access to the central cavity 132 of the frame 118 from the aft side 122. In some examples, the portions of the frame with the reduced thickness 134A define the opening 136. As one non-limiting case, in the example of FIGS. 1-7 where the upper portion 124 has the reduced thickness 134A and the lower portion 126 has the unreduced thickness 134B, the upper portion 124 may define the opening 136 in the aft side 122. As another non-limiting case, in an example where the entire frame has the reduced thickness 134A, the entire aft side 122 of the frame may define the opening 136 providing access to the central cavity 132. In some cases, the entire portion of the frame 118 with the reduced thickness 134A need not define the opening 136. Moreover, in various examples, portions of the frame with the unreduced thickness 134B may also define the opening 136.

Figure 7:
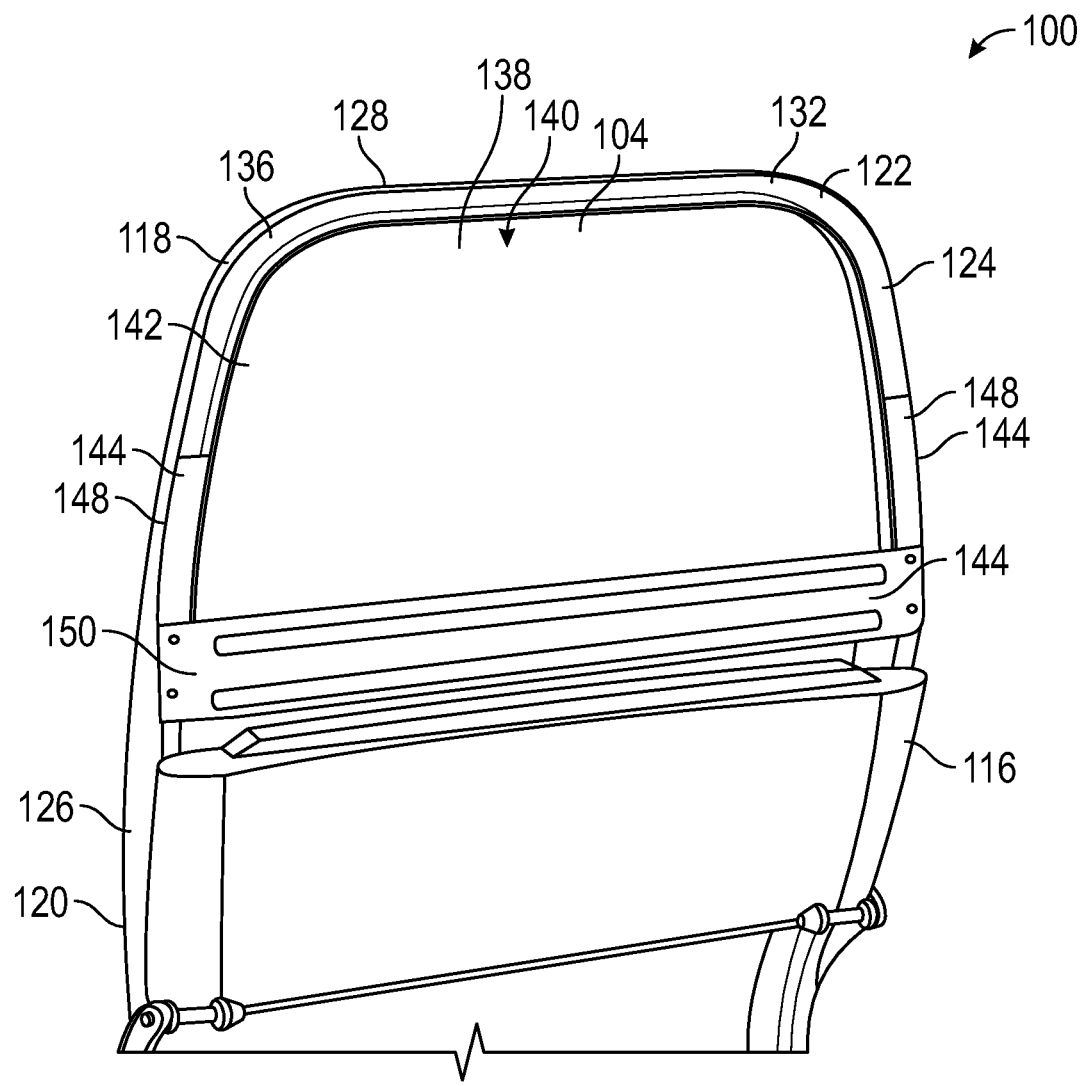
FIG. 7 is a perspective view a portion of the seat back of FIG. 1 with reinforcing members.

Referring to FIG. 7, in some examples, one or more reinforcing members 144 may be selectively joined to the frame 118 in the opening 136 to provide selective reinforcement and strengthening of the frame 118. In some cases, the reinforcing members 144 may be at least partially positioned within the opening 136, and may be joined to the frame 118 through various suitable mechanisms including, but not limited to, welding, adhesives, mechanical fasteners, and/or various other suitable mechanisms or combination of mechanisms. In certain examples, the reinforcing members 144 are joined to the frame 118 after the frame 118 has been shaped into the shape for the seat back 104.

As mentioned, the reinforcing members 144 may be provided to strengthen particular portions of the frame 118. As some non-limiting examples, the reinforcing members may be provided at bends in the frame 118, attachment locations where the frame 118 is joined with other components, etc. The reinforcing members 144 may be various suitable components for providing improved structural integrity, including, but not limited to, torque tubes, doublers, inserts, stiffeners, reinforcing bars, and/or various other suitable components. In the example of FIG. 7, the reinforcing members 144 include two inserts 148 and a stiffener 150. Optionally, the reinforcing members 144 may define attachment or connection points for various other components including, but not limited to, IFE equipment, a shroud mount, a video mount, the tray table 116, etc.

Figure 9:
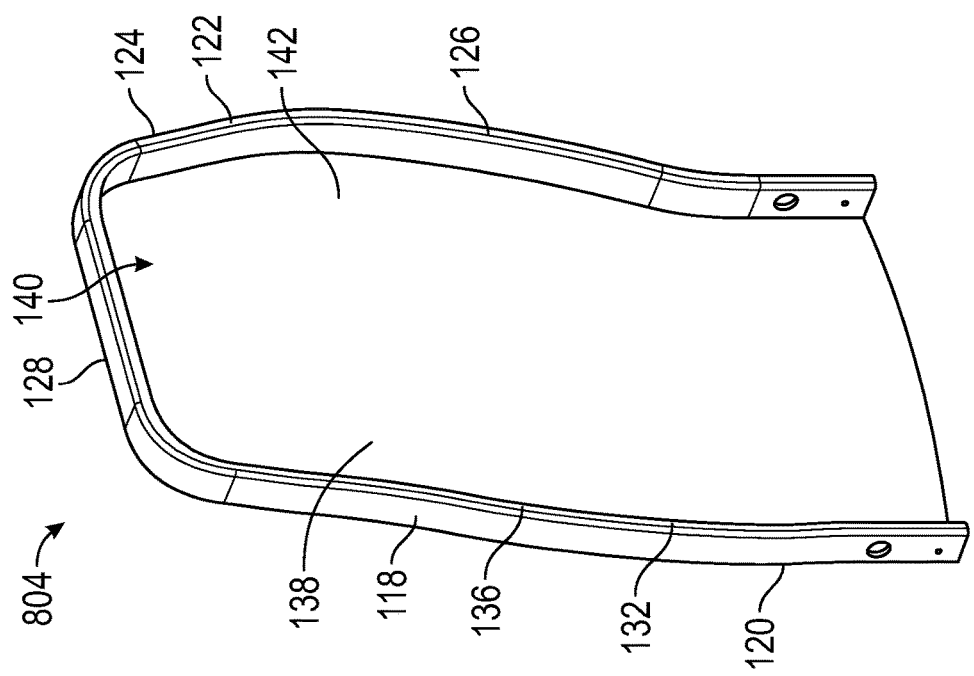
FIG. 9 is a perspective view of the seat back of FIG. 8.
Figure 8:
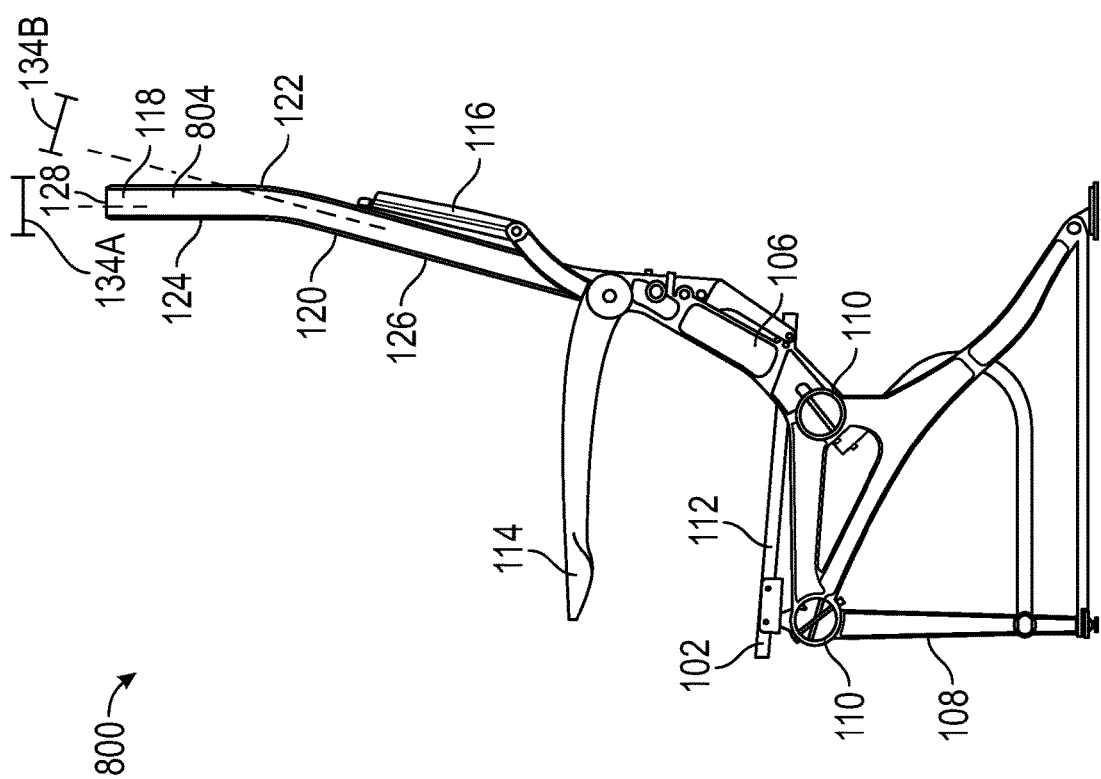
FIG. 8 is a side view of a passenger seat with a seat back according to certain embodiments of the present disclosure.

FIGS. 8 and 9 illustrate an example of a passenger seat assembly 800 with a seat back 804 that is substantially similar to the passenger seat assembly 100 with the seat back 104 except that the entire frame 118 of the seat back 804 has the reduced thickness 134A, and the entire aft side 122 of the frame 118 defines the opening 136.

Through the frame 118, the passenger seat assembly 100 or 800 has a seat back 104 that is both lightweight and improves the living space of an aft passenger seat assembly. In various aspects, the seat back 104 is lightweight because the frame 118 includes the central cavity 132, and at least a portion of the frame 118 has the reduced thickness 134A. Because the frame 118 has the central cavity and the reduced thickness 134A, less material is included with the seat back 104. Moreover, through the at least one opening 136, the reinforcing members 144 may be provided at selective locations on the frame 118 that may need additional strengthening while other portions of the frame 118 can remain lightweight (e.g., because the reinforcing members 144 are not attached at those locations)

The seat back 104 also improves the living space of the aft passenger seat assembly because at least the portion of the frame 118 has the reduced thickness. In other words, the space occupied by the material that is removed from the frame 118 is gained by the living space due to the reduced thickness 134A. As one non-limiting example, if the upper portion 124 of the frame initially has a thickness of about 30.0 mm, and the thickness is reduced to a reduced thickness of about 2.0 mm, the material removed or omitted from the frame 118 to produce the reduced thickness (in this example, about 28.0 mm) is gained as additional living space for the passenger in an aft passenger seat assembly. As such, with the reduced thickness 134A, the seat back 104 provides more living space for the passenger in the aft passenger seat to utilize. The seat back 104 also provides weight reduction to the overall seat, as less material is used to form the seat back 104. Such weight reduction may provide cost savings, as well as allow the weight to be utilized for other components of the seat and/or within the passenger vehicle.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A seat back for a passenger seat, the seat back comprising a frame, the frame comprising: an upper portion comprising a top end of the seat back; and a lower portion adjacent to the upper portion, wherein a thickness of the upper portion of the frame is less than a thickness of the lower portion of the frame.

EC 2. The seat back of any of the preceding or subsequent example combinations, wherein the frame is tubular and defines a central cavity.

EC 3. The seat back of any of the preceding or subsequent example combinations, wherein the frame supports a back sheet, and wherein the back sheet defines a housing area in an aft side of the seat back.

EC 4. The seat back of any of the preceding or subsequent example combinations, wherein the upper portion of the frame extends vertically at a non-zero angle relative to the lower portion of the frame.

EC 5. The seat back of any of the preceding or subsequent example combinations, further comprising a reinforcing member reinforcing at least a portion of the upper portion of the frame.

EC 6. The seat back of any of the preceding or subsequent example combinations, wherein the reinforcing member comprises at least one of a doubler and a stiffener joined to the upper portion of the frame.

EC 7. The seat back of any of the preceding or subsequent example combinations, wherein the frame comprises a metal material.

EC 8. A passenger seat comprising a seat back, the seat back comprising a tubular frame, the tubular frame comprising: a forward side; an aft side; an upper portion; and a lower portion, wherein a distance from the forward side to the aft side is a thickness of the tubular frame, and wherein the thickness of the upper portion of the tubular frame is less than the thickness of the lower portion of the tubular frame.

EC 9. The passenger seat of any of the preceding or subsequent example combinations, further comprising a seat base, and wherein the seat back is joined to the seat base.

EC 10. The passenger seat of any of the preceding or subsequent example combinations, further comprising a reinforcing member joined to at least a portion of the upper portion of the tubular frame, and wherein the reinforcing member comprises at least one of a doubler and a stiffener.

EC 11. The passenger seat of any of the preceding or subsequent example combinations, wherein the reinforcing member defines a mounting location on the upper portion of the tubular frame for a shroud mount or a video mount.

EC 12. The passenger seat of any of the preceding or subsequent example combinations, wherein the reinforcing member is joined to the portion of the upper portion of the tubular frame through at least one of a mechanical fastener, welding, and an adhesive.

EC 13. The passenger seat of any of the preceding or subsequent example combinations, wherein the upper portion of the tubular frame extends vertically at a non-zero angle relative to the lower portion of the tubular frame such that the upper portion of the tubular frame extends forward relative to the lower portion of the tubular frame.

EC 14. The passenger seat of any of the preceding or subsequent example combinations, wherein the tubular frame supports a back sheet, and wherein the back sheet defines a housing area in an aft side of the seat back.

EC 15. The passenger seat of any of the preceding or subsequent example combinations, wherein the tubular frame comprises a metal material.

EC 16. A seat back for a passenger seat, the seat back comprising a seat back frame, the seat back frame comprising: a lower portion adapted to pivotally join with a seat base, the lower portion comprising a lower portion thickness; and an upper portion extending at a non-zero angle relative to the lower portion, wherein the upper portion comprises an upper portion thickness that is less than the lower portion thickness.

EC 17. The seat back of any of the preceding or subsequent example combinations, further comprising a reinforcing member joined to at least a portion of the upper portion of the seat back frame, and wherein the reinforcing member comprises at least one of a doubler and a stiffener.

EC 18. The seat back of any of the preceding or subsequent example combinations, wherein the seat back frame is a tubular frame, and wherein the seat back further comprises a back sheet supported by the seat back frame, and wherein the seat back frame and the back sheet define a housing area in an aft side of the seat back.

EC 19. The seat back of any of the preceding or subsequent example combinations, wherein the seat back frame comprises a metal material.

EC 20. The seat back of any of the preceding or subsequent example combinations, wherein the upper portion of the seat back frame extends forward relative to the lower portion of the seat back frame.

EC 21. A passenger seat comprising a seat back, the seat back comprising a hollow frame, the hollow frame comprising: a forward side; an aft side; and a central cavity defined within the hollow frame, wherein a distance from the forward side to the aft side is a thickness of the hollow frame, and wherein at least a portion of the aft side of the hollow frame defines an aperture providing access to the central cavity.

EC 22. The passenger seat of any of the preceding or subsequent example combinations, further comprising a seat base, and wherein the seat back is joined to the seat base.

EC 23. The passenger seat of any of the preceding or subsequent example combinations, wherein the thickness of the hollow frame is from about 0.0 mm to about 70.0 mm, such as from about 0.0 mm to about 25.0 mm, such as from about 2.0 mm to about 25.0 mm.

EC 24. The passenger seat of any of the preceding or subsequent example combinations, further comprising a reinforcing member, wherein the reinforcing member is positionable in the aperture and is joined to the hollow frame.

EC 25. The passenger seat of any of the preceding or subsequent example combinations, wherein the hollow frame further comprises an upper portion and a lower portion, wherein the upper portion defines a top end of the seat back, wherein the thickness of the upper portion of the hollow frame is less than the thickness of the lower portion of the hollow frame.

EC 26. The passenger seat of any of the preceding or subsequent example combinations, wherein the upper portion defines the aperture providing access to the central cavity.

EC 27. The passenger seat of any of the preceding or subsequent example combinations, wherein the entire aft side of the hollow frame defines the aperture providing access to the central cavity.

EC 28. The passenger seat or seat back of any of the preceding or subsequent example combinations, wherein the hollow frame comprises a plurality of frame segments joined together to form the frame.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising a seat back, the seat back comprising a single-component hollow frame, the single-component hollow frame comprising:
    a forward side;
    an aft side comprising a first portion and a second portion, wherein the first portion is offset from the second portion and towards the forward side;
    an upper portion comprising the first portion of the aft side;
    a lower portion comprising the second portion of the aft side; and
    a central cavity defined within the hollow frame,
    wherein a distance from the forward side to the aft side is a thickness of the hollow frame,
    wherein at least a portion of the aft side of the hollow frame defines an aperture providing access to the central cavity, and
    wherein the tubular frame supports a back sheet, wherein the back sheet is supported at the forward side of the tubular frame and such that the back sheet defines a housing area in an aft side of the seat back, wherein the housing area comprises a housing area surface that is recessed within the seat back relative to the aft side of the tubular frame.

2. The passenger seat of claim 1, further comprising a seat base, and wherein the seat back is joined to the seat base.

3. The passenger seat of claim 1, wherein the thickness of the hollow frame is from about 0.0 mm to about 70.0 mm.

4. The passenger seat of claim 1, further comprising a reinforcing member, wherein the reinforcing member is positionable in the aperture and is joined to the hollow frame.

5. The passenger seat of claim 1, wherein the hollow frame further comprises an upper portion and a lower portion, wherein the upper portion defines a top end of the seat back, and wherein the thickness of the upper portion of the hollow frame is less than the thickness of the lower portion of the hollow frame.

6. The passenger seat of claim 5, wherein the upper portion defines the aperture providing access to the central cavity.

7. The passenger seat of claim 1, wherein the entire aft side of the hollow frame defines the aperture providing access to the central cavity.

* * * * *